(12) United States Patent
Brown

(10) Patent No.: US 11,122,769 B1
(45) Date of Patent: Sep. 21, 2021

(54) DOG KENNEL

(71) Applicant: Tazwa Brown, Jacksonville, FL (US)

(72) Inventor: Tazwa Brown, Jacksonville, FL (US)

( * ) Notice: Subject to any disclaimer, the term of this patent is extended or adjusted under 35 U.S.C. 154(b) by 475 days.

(21) Appl. No.: 15/686,591

(22) Filed: Aug. 25, 2017

(51) Int. Cl.
*A01K 1/035* (2006.01)
*A01K 1/03* (2006.01)

(52) U.S. Cl.
CPC ............ *A01K 1/0356* (2013.01); *A01K 1/034* (2013.01)

(58) Field of Classification Search
CPC .......... A01K 1/02; A01K 1/025; A01K 1/033; A01K 1/034; A01K 1/032; A01K 1/0005; A01K 1/03; A01K 1/0088; A01K 31/10; A01K 31/06; A01K 31/07; A01K 31/08
See application file for complete search history.

(56) References Cited

U.S. PATENT DOCUMENTS

| | | | | |
|---|---|---|---|---|
| 1,422,283 | A * | 7/1922 | McKim | A01K 1/032 119/483 |
| 3,951,106 | A * | 4/1976 | Wright | A01K 1/034 119/482 |
| 4,696,259 | A * | 9/1987 | Fewox | A01K 1/034 119/452 |
| 5,092,270 | A * | 3/1992 | Simons | A01K 1/0245 119/165 |
| 5,107,792 | A * | 4/1992 | Bugl | A01K 1/0041 119/448 |
| 5,471,950 | A * | 12/1995 | White | A01K 1/0107 119/165 |
| 5,503,107 | A * | 4/1996 | Satcher | A01K 1/0236 119/496 |
| 5,881,678 | A * | 3/1999 | Morley | A01K 1/0236 119/496 |
| 6,209,490 | B1 * | 4/2001 | Schwede | A01K 1/0236 119/472 |
| 6,659,045 | B2 * | 12/2003 | Thompson | A01K 1/0107 119/482 |
| 6,945,194 | B2 * | 9/2005 | Fritsch | A01K 1/0088 119/454 |
| 7,025,019 | B2 | 4/2006 | Axelrod | |
| 7,753,003 | B2 | 7/2010 | Farmer et al. | |
| 8,146,534 | B1 | 4/2012 | Robertson | |
| 9,585,364 | B2 | 3/2017 | Jones | |
| 2004/0139921 | A1 * | 7/2004 | Kost | A01K 1/0236 119/482 |
| 2010/0043720 | A1 * | 2/2010 | Yelverton | A01K 1/0245 119/496 |
| 2014/0305378 | A1 * | 10/2014 | Lever | A01K 1/03 119/417 |
| 2016/0037744 | A1 | 2/2016 | Rudin | |

FOREIGN PATENT DOCUMENTS

CH 92338 A * 1/1922 ............. A01K 1/032

* cited by examiner

*Primary Examiner* — Magdalena Topolski
(74) *Attorney, Agent, or Firm* — Law Office of Mitchell Ghaneie, P.A.; Mitchell Ghaneie; Christopher Roberts

(57) ABSTRACT

A dog kennel that provides a partition wall to separate a kennel into at least two compartments. One compartment is intended to be the living area of the dog and a second compartment is intended to house the food and water for the dog. The partition wall provides an opening for the dog to have access to her or his food and water, while also restricting the dog from entering the food and water compartment. An additional storage compartment may also be provided above the food and water compartment.

14 Claims, 8 Drawing Sheets

DOG KENNEL

BACKGROUND OF THE INVENTION

A. Field of the Invention

This invention relates to providing a separate area within a kennel for a dog's food and water bowl to help ensure that the contents within the food and water bowls are not spilt.

B. Prior Art

While dog kennels have been in existence for an extended period of time, none offer the unique and novel elements claimed herein. Owners of dogs often leave their dog in a kennel for several hours or overnight in order to prevent the dog from causing damage to the owner's home, to transport the dog from one location to another, or as the dogs everyday resting place in the home. While it is recommended to provide food and water within the kennel, the dog can often knock the food and water out of the respective containers and into the kennel as well as on the dog itself. This, in turn, causes a mess within the kennel and for the dog to smell from becoming wet. Accordingly, the dog's owner will need to clean the mess within the kennel, give the dog a bath, or both. For many dog owners, this is a daily chore that must be completed. The present invention described and claimed herein, helps to ensure that the food and water are kept within the containers, but also accessible to the dog for drinking and eating.

BRIEF SUMMARY OF THE INVENTION

The present invention is a dog kennel with a partition wall that is shown and described in five embodiments. The partition wall within the kennel separates the kennel into at least two compartments. On one side of the partition wall the dog can sleep or rest and on the other side of the partition wall the dog's food and water is provided. The partition wall has an opening to allow the dog to fit his or her head through and reach the food and water bowls without spilling the contents within them into the kennel. This is particularly beneficial for traveling when dogs tend to be more anxious and frantic causing them to walk or jump within the kennel. This is particularly true when animals are separated from their owner, which commonly occurs on airlines. The dog may be left for hours in the heat without water if it is spilled by the dog. The present invention helps ensure that this does not occur by providing a separate food and water compartment which is accessible to the dog's head.

It is anticipated that a flap over the opening that is tethered to the partition wall can additionally be provided to prevent the dog from getting completely into the food and water compartment. An additional door can also be provided so the food and water can be replenished without risking the dog's escape. Furthermore, the flap can be locked in a closed position, to help prevent a person from being bitten by the dog as he or she replenishes the food and water. Another compartment may also be provided with its own door above the food and water compartment for storage. This would allow an owner to place extra food, water, and other items needed for the dog's care in the storage compartment.

In the second embodiment of the invention it is anticipated that the partition wall can be placed in a preexisting kennel. The third embodiment anticipates the partition wall in a metal collapsible kennel. The fourth embodiment anticipates placing the partition wall in a collapsible fabric kennel. Lastly, the fifth embodiment anticipates the partition wall, food and water compartment, and storage compartment being used with a playpen for a dog.

NUMBERING REFERENCE

Figure 1:
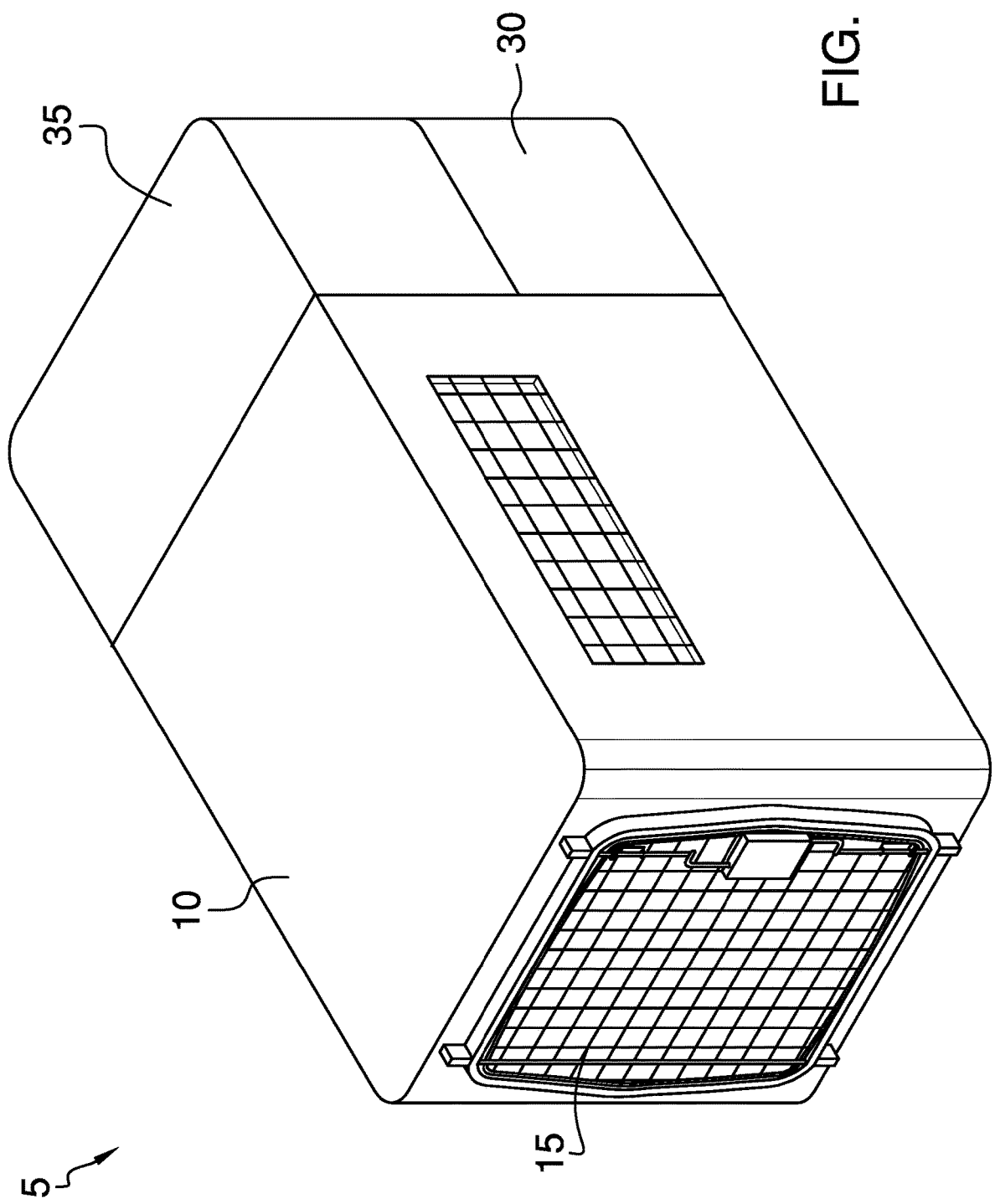
FIG. 1 is a front isometric view of a first embodiment of the invention.
Figure 2:
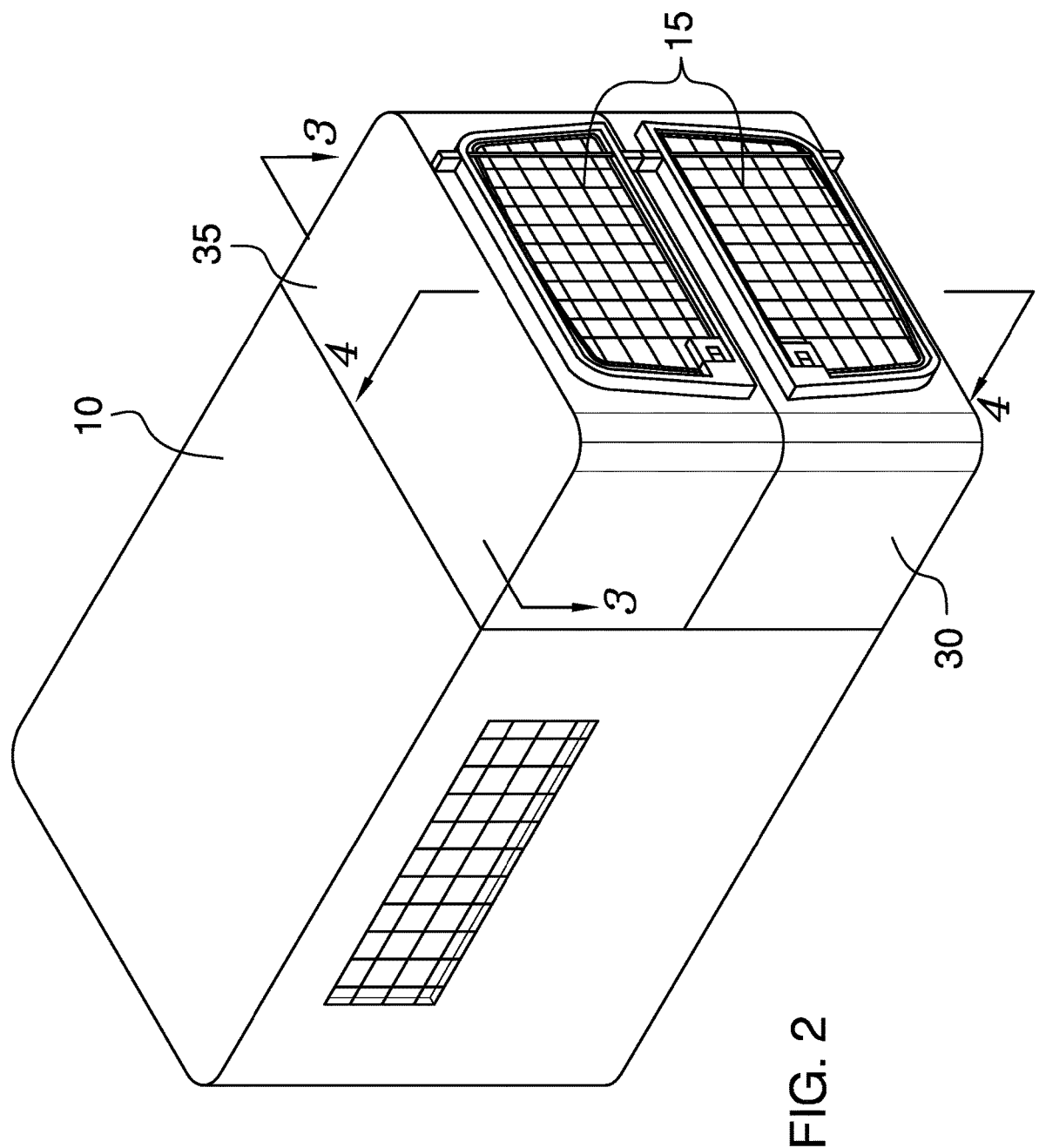
FIG. 2 is back isometric view of the first embodiment of the invention.
Figure 3:
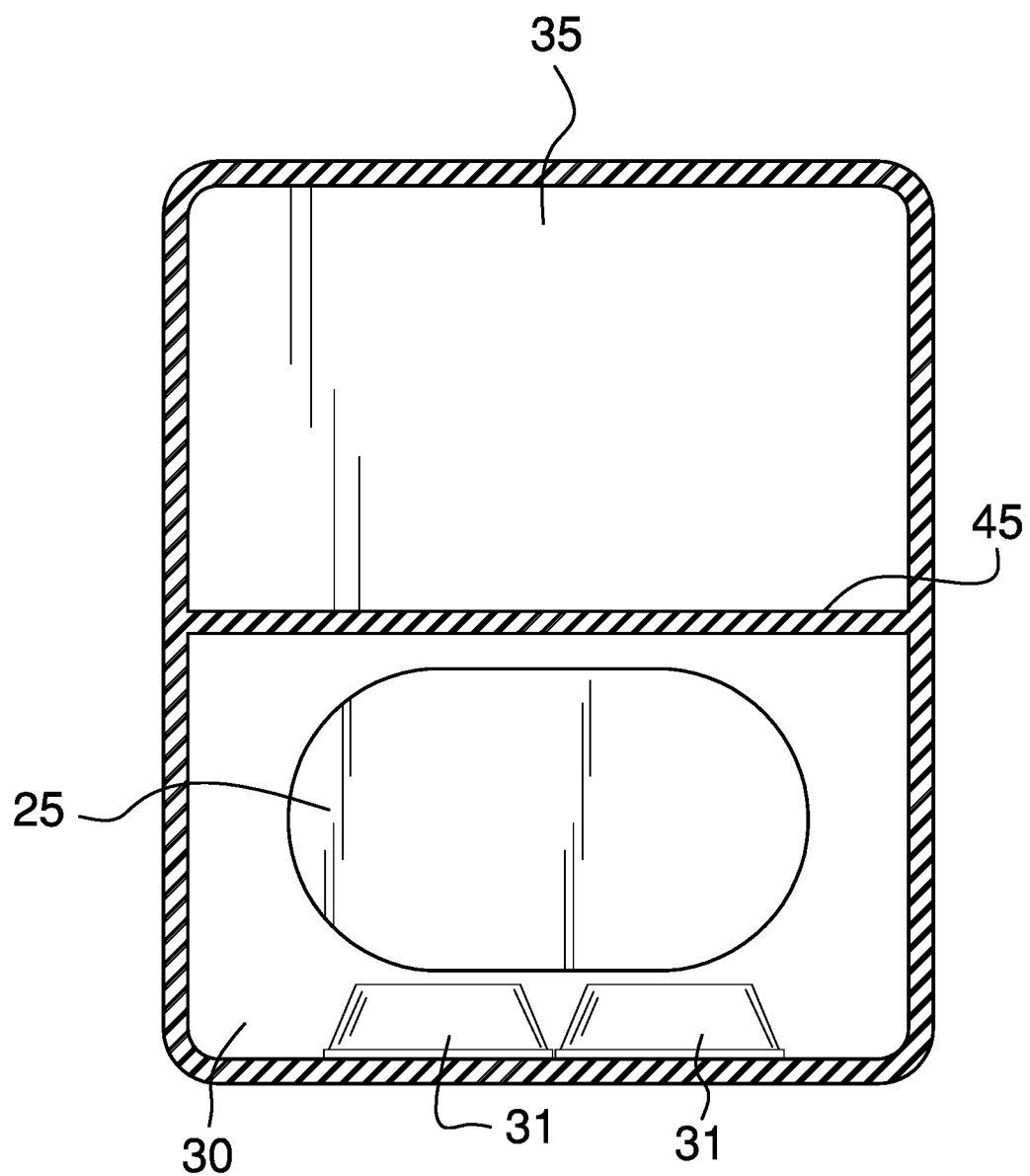
FIG. 3 is a cross-sectional view of the first embodiment of the invention.

5—Device
10—Habitation compartment
15—Kennel doors
20—Opening
25—Flap
26—Tether
30—Food and water compartment
35—Storage compartment
40—Partition wall
45—Integrated separation floor
50—Second embodiment
55—Compression foot
58—Separation floor (Second Embodiment)
60—Third Embodiment
61—Hook
62—Hinge
63—Metal Exterior
67—Pivoting separation floor
70—Fourth embodiment
71—Solid ends
73—Locking coupler
74—Collapsible frame
76—Separation floor (Fourth Embodiment)
80—Fifth embodiment
82—playpen

DETAILED DESCRIPTION OF THE EMBODIMENTS

This invention is a kennel with a partition wall 40 that provides an opening 20 for a dog's head to fit through. The partition wall 40 is provided to separate the dog from his or her water and food bowls to limit the dog's ability to knock or spill the contents within the bowls into the kennel or onto the dog itself. Accordingly, the partition wall 40 separates the kennel into at least a habitation compartment 10 and a food and water compartment 30. The opening 20 in the partition wall 40 allows the dog access to the water and food while in the habitation compartment 10 of the kennel. There are five embodiments described herein. Each of the embodiments provide a partition wall 40 to separate the dog's living space into at least two compartments: a habitation compartment 10, and a food and water compartment 30. It is anticipated that a storage compartment 35 could additionally be provided in each embodiment with the use of an integrated separation floor 45. Furthermore, while it is not shown a lock may be provided on the flap 25 to prevent the flap from opening. This would likely be beneficial to an individual, whom the dog is not familiar with, to safely refill the food and water within the food and water compartment 30.

First Embodiment

Figure 4:
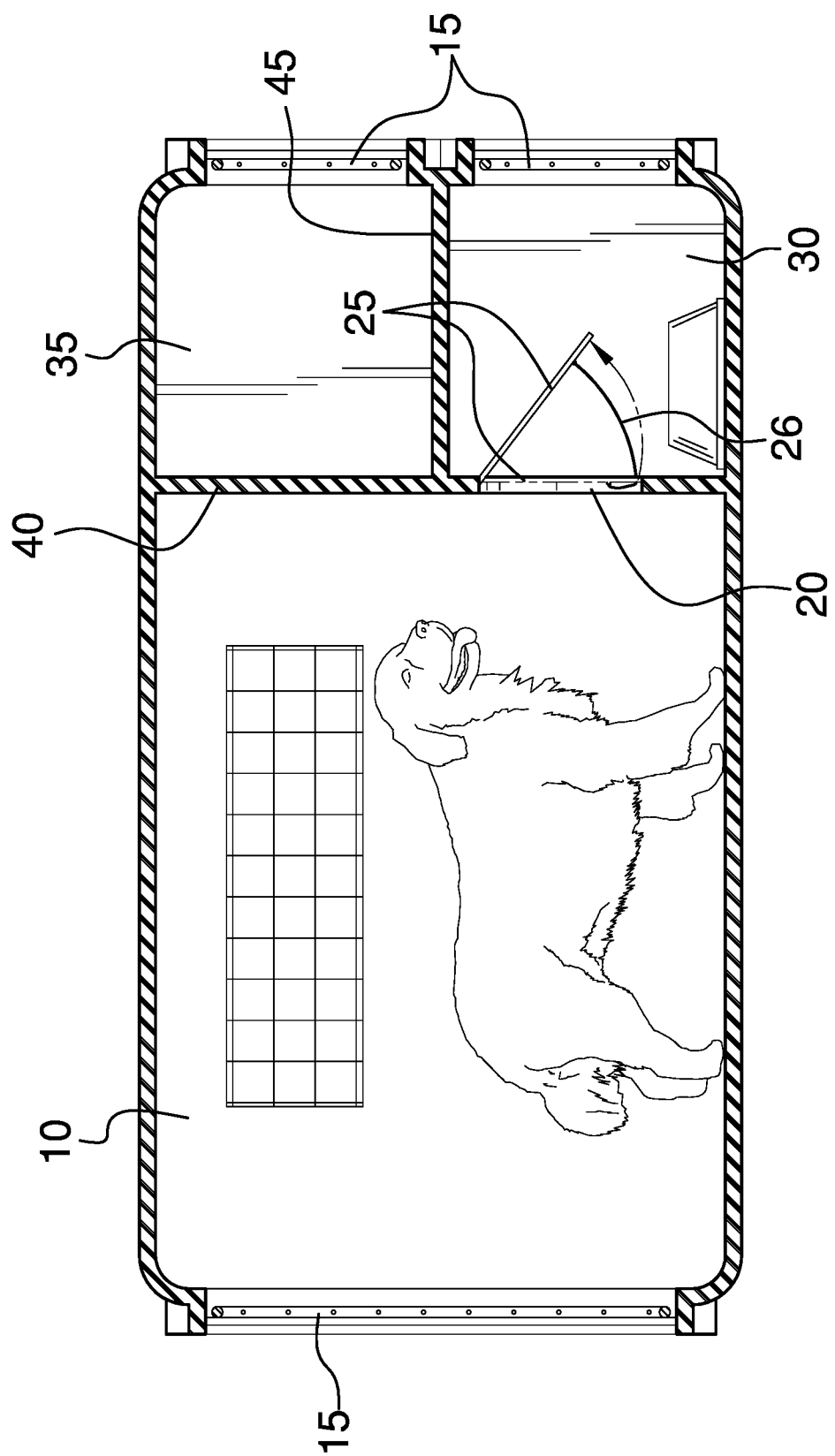
FIG. 4 is a cross-sectional view of the first embodiment of the invention showing a partition wall, a food and water compartment, and a storage compartment.

The first embodiment 5 provides a partition wall 40 that is permanently attached to the dog kennel as shown in FIG. 4. The kennel provides a kennel door 15 that the dog may use to enter and exit the kennel and an additional kennel door 15 that provides access to the food and water compartment 30. The partition wall 40 has a top end and a bottom end. The top end is affixed to the top of the kennel and the bottom end is affixed to the floor of the kennel. An opening 20 is provided in the partition wall 40 proximate to the bottom end. It is critical that the opening 20 be large enough for a dog to insert her or his head through the opening 20 into the food and water compartment 30.

A flap 25 can be attached to the partition wall 40 to cover the opening 20. The flap 25 has a top end and a bottom end. The top end of the flap is attached to the partition wall 40. The bottom end may be left unattached to the partition wall 40 or attached. If the flap 25 is unattached, the dog may move the flap 25 as she or he desires. However, a tether 26 can be provided between the partition wall 40 and the bottom end of the flap 25 to assist in preventing the dog from crawling through the opening 20 and into the food and water compartment 30. In other words, the flap 25 and tether 26 can help ensure that the dog is limited to only inserting her or his head through the opening 20.

An integrated separation floor 45 may be affixed to the partition wall 40 and kennel, as shown in FIG. 4, to provide an additional compartment 35 within the kennel for storage. The additional storage compartment 35 would be located above the food and water compartment 30. Accordingly, the storage compartment 35 may be utilized for storing items related to caring for the dog in the kennel. Although the storage compartment 35 is shown to be relatively the same size as the food and water compartment 30, each compartment may be a different size depending on the preference of the user or the size of the dog.

Second Embodiment

Figure 5:
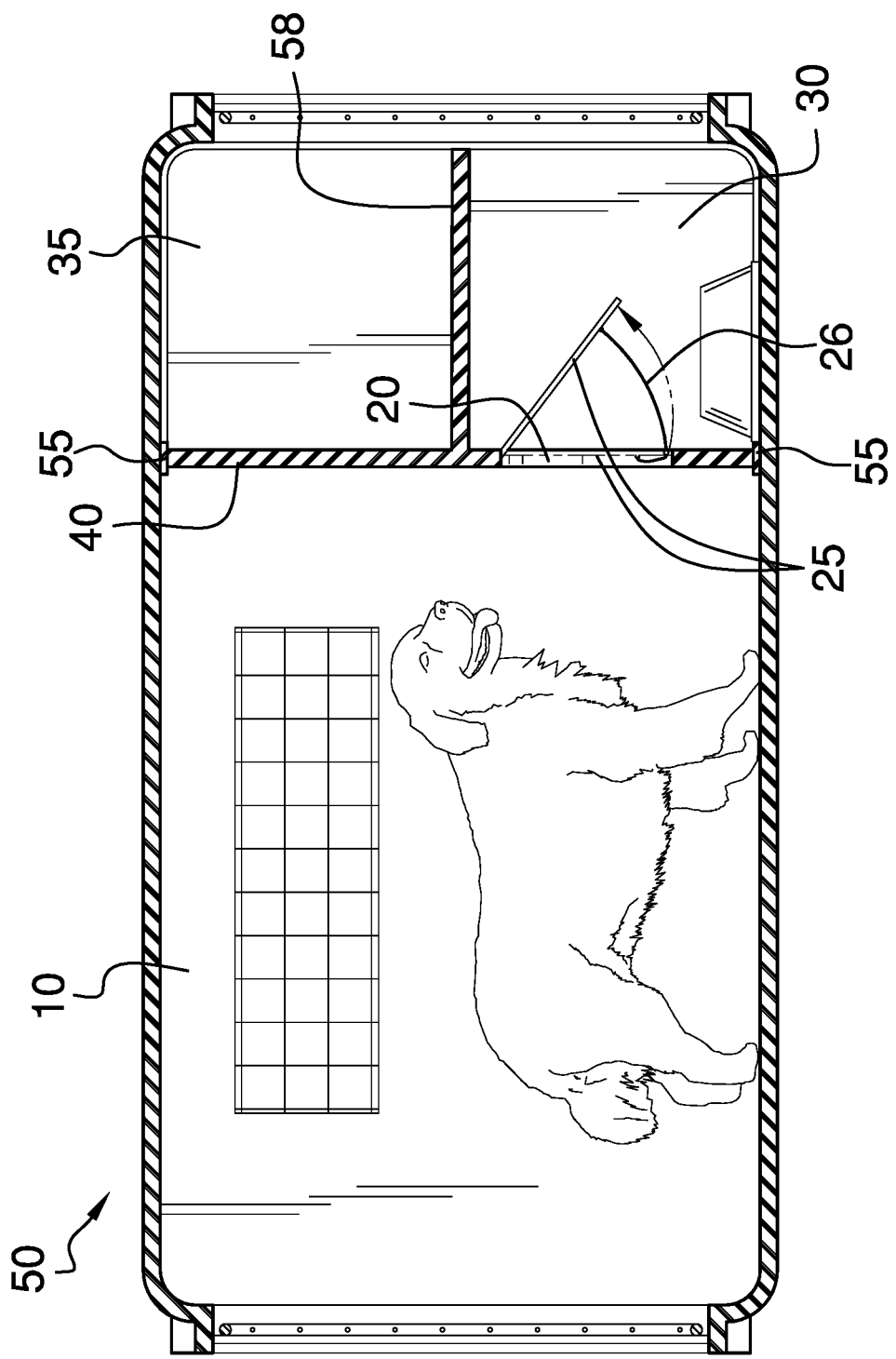
FIG. 5 is a cross-sectional view of a second embodiment of the invention showing a removable partition wall provided on an existing kennel that in turn provides a food and water compartment and a storage compartment.

This second embodiment 50 is for a removable partition wall 40 that is installed in a preexisting dog kennel that provides a kennel door 15 on either end. The partition wall 40 has a top end and a bottom end. The top end of the partition wall 40 has a first compression foot 55 and the bottom end of the partition wall 40 has a second compression foot 55 as shown in FIG. 5. The partition wall 40 has an opening 20 and a flap 25 that covers the opening 20. In order to ensure that the dog cannot crawl through the opening 20, a tether 26 is attached to the bottom end of the flap 25 and the partition wall 40. Each compression foot 55 is adjustable so the user may install the partition wall 40 into dog kennels of varying heights. As each foot 55 is adjusted they compress against the top of the kennel and floor of the kennel to hold the partition well 40 in place.

This second embodiment 50 also provides a separation floor 58, which is affixed to the removable partition wall 40. Thus, an additional compartment 35 is created within the kennel, which is shown FIG. 5. While the storage compartment 35 is shown to be relatively the same size as the food and water compartment 30, they may be different sizes depending on the preference of the user and the size of the dog.

Third Embodiment

This third embodiment 60 discloses a collapsible metal kennel with a removeable partition wall 40. The partition wall 40 provides an opening 20, a flap 25, and a tether 26. The partition wall 40 described in this embodiment additionally provides a hook 61 that is attached to the top of the kennel and a compression foot 55 that is attached to its bottom end.

Figure 6:
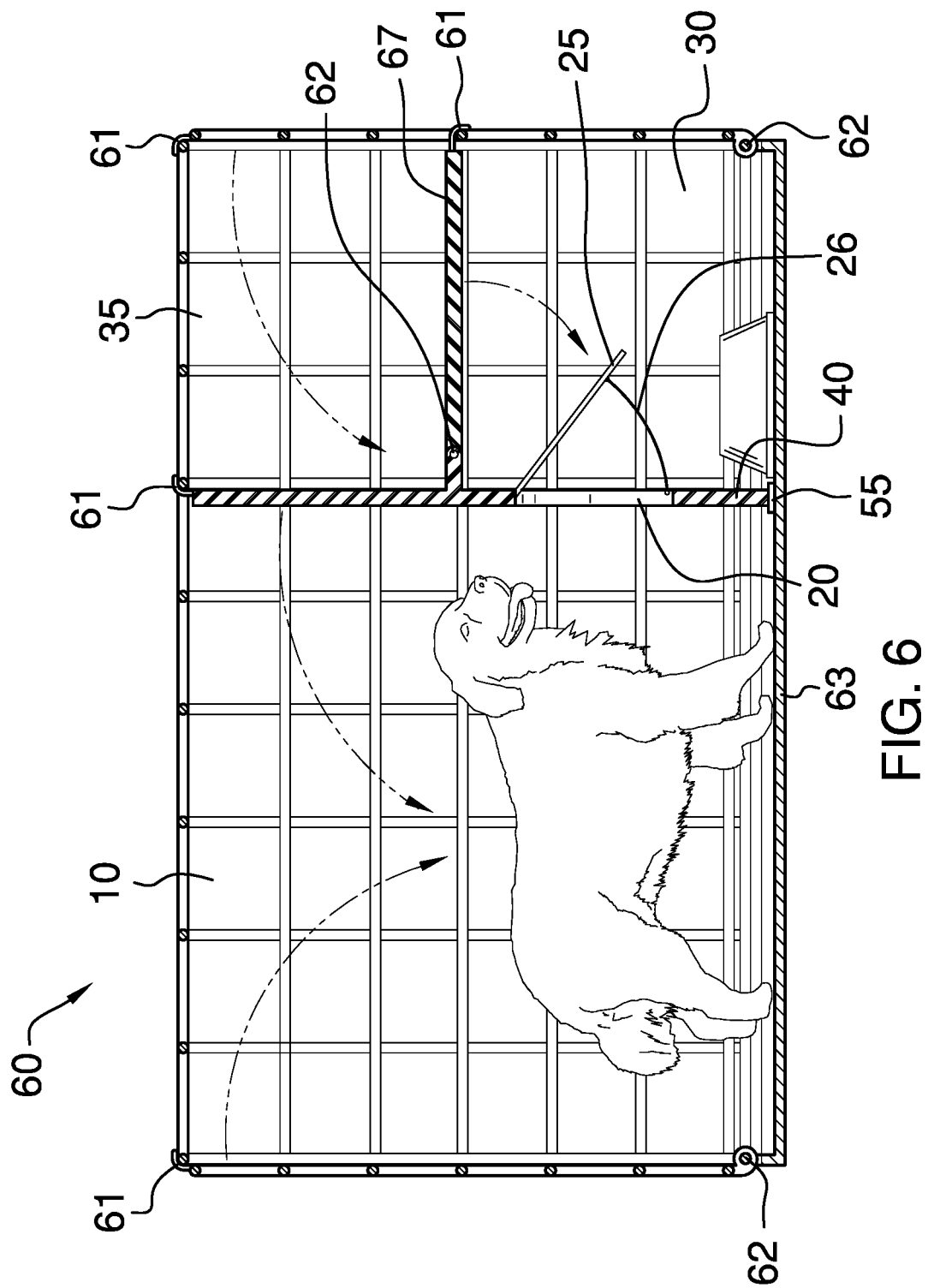
FIG. 6 is a cross-sectional view of a third embodiment of the invention showing a collapsible metal cage, partition wall, separation floor, food and water compartment, and a storage compartment.

A pivoting separation floor 67 is attached to the partition wall 40 and provides a hinge 62 and a hook 61, which is shown in FIG. 6. The pivoting separation floor 67 is capable of pivoting about the hinge 62 when a user desires to collapse the kennel. The hook 61, which is placed on the pivoting separation floor 67, allows for the pivoting separation floor 67 to remain perpendicular to the partition wall 40. While the storage compartment 35 is shown to be relatively the same size as the food and water compartment 30, they may be different sizes depending on the preference of the user and the size of the dog.

Fourth Embodiment

Figure 7:
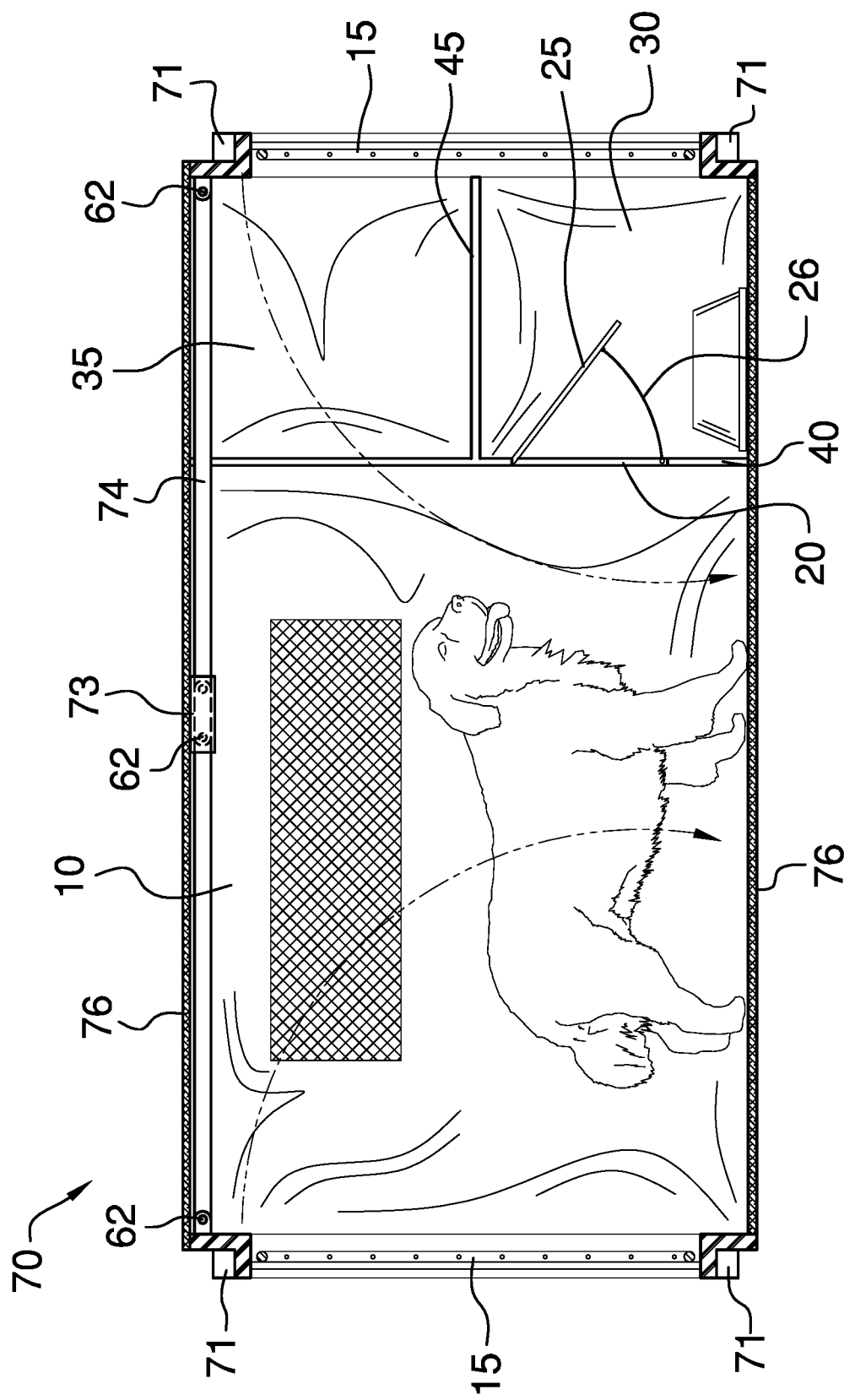
FIG. 7 is a cross-sectional view of a fourth embodiment of the invention showing a collapsible cage with fabric walls, partition wall, separation floor, food and water compartment, and a storage compartment.

This fourth embodiment 70 is shown in FIG. 7 and discloses a collapsible fabric kennel with solid ends 71, a rigid collapsible frame 74 that locks in an expanded position with a locking coupler 73. In this embodiment, the partition wall 40 and separation floor 45 is made of a cloth material and is capable of collapsing when the kennel is collapsed. Similarly, to the other embodiments the partition wall 40 has an opening 20, a flap, 25, and a tether 26 that is attached between the partition wall 40 and the flap 26. While the storage compartment 35 is shown to be relatively the same size as the food and water compartment 30, they may be different sizes depending on the preference of the user and the size of the dog.

Fifth Embodiment

Figure 8:
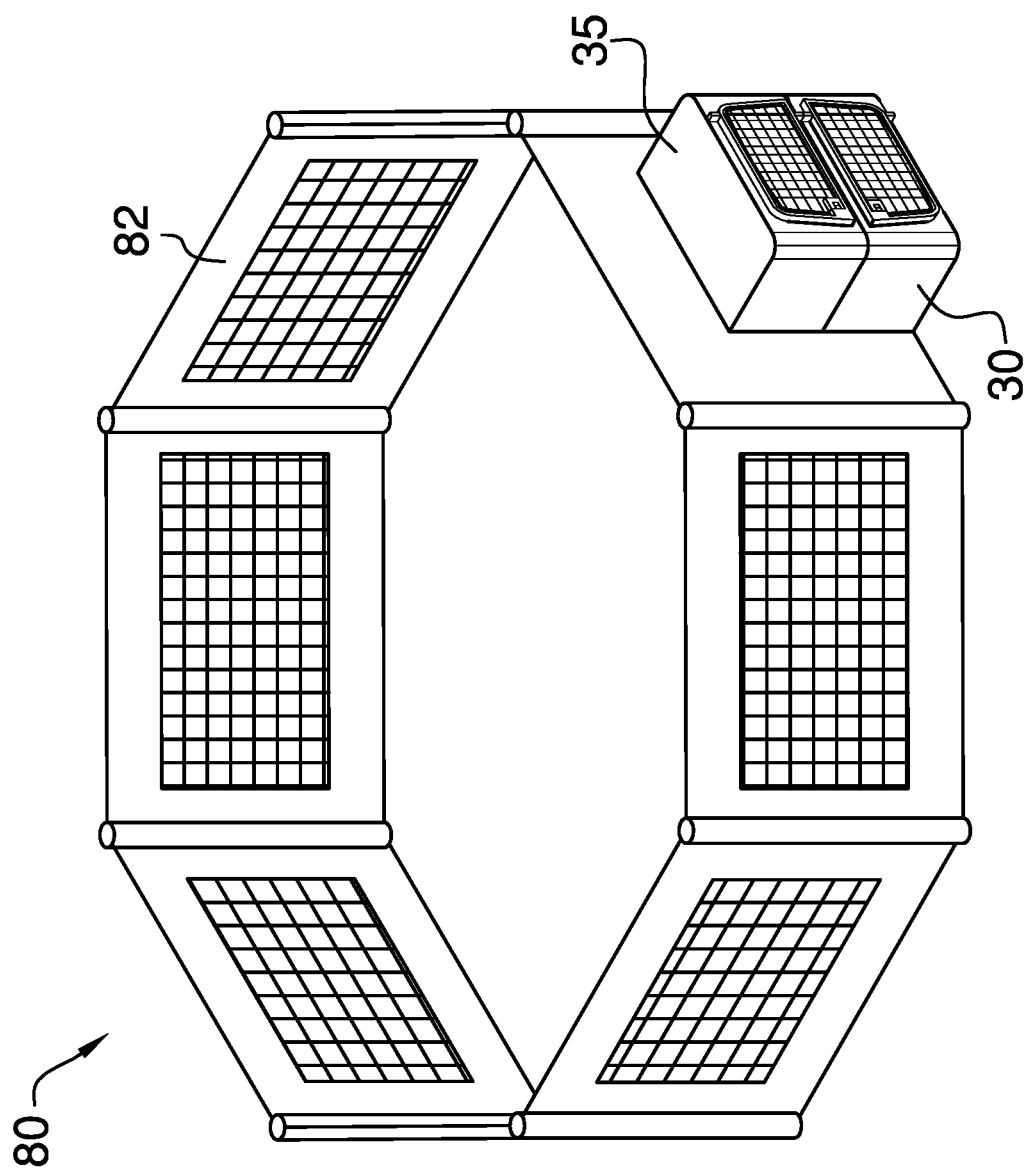
FIG. 8 is an isometric view of a fifth embodiment, which shows the invention connected to an animal playpen.

This fifth embodiment 80 is shown in FIG. 8 and discloses food and water compartment 30 and a storage compartment 35 attached to a playpen 82. This embodiment is distinguished from the other embodiments because the playpen 82 operates as an alternative to the habitation compartment 10 of the kennel. However, a partition wall 40 is utilized to prevent a dog from spilling her or his food or water while in the playpen 82. Accordingly, the partition wall 40 could be larger in height and width than the food and water compartment 30 and the storage compartment 35 by operating as a panel of the playpen 82. However, the partition wall 40 would provide an opening 20 for the dog to have access to food and water. While the storage compartment 35 is shown to be relatively the same size as the food and water compartment 30, they may be different sizes depending on the preference of the user and the size of the dog.

Although the embodiments of the invention have been disclosed, certain modifications may be made by those skilled in the art to modify the invention without departing from the spirit of the invention.

The inventor claims:

1. A dog kennel, which is comprised of:
   a. a habitation compartment;
   b. a first kennel door;
      wherein the first kennel door is attached to the habitation compartment;
   c. a food and water compartment;
   d. a second kennel door;
      wherein the second kennel door is attached to the food and water compartment;
   e. a partition wall;
      wherein the partition wall is a vertical partition wall;
      wherein the partition wall separates the habitation compartment from the food and water compartment;
      wherein the partition wall has an opening;
      wherein the partition wall has a top end;
      wherein the partition wall has a bottom end;
      wherein the opening is provided above the bottom end and below the top end of the partition wall such that it restricts an animal from completely entering the food and water compartment;
      wherein the portion of the partition wall between the bottom end and the opening substantially prevents the contents provided within the food and water compartment from spilling into the habitation compartment;
   f. a flap;
      wherein the flap has a first end and a second end;
      wherein the first end of the flap is attached to the partition wall;
      wherein the flap covers the opening.

2. The dog kennel described in claim 1 wherein a tether is provided between the second end of the flap and the partition wall.

3. The dog kennel described in claim 2 wherein the tether restricts rotation of the flap relative to the partition wall.

4. The dog kennel described in claim 1 wherein a storage compartment is provided above the food and water compartment.

5. The dog kennel described in claim 4 wherein a third kennel door is attached to the storage compartment.

6. The dog kennel described in claim 4 wherein the second kennel door is attached to the food and water compartment and the storage compartment.

7. The dog kennel described in claim 1 wherein a separation floor is attached to the partition wall.

8. The dog kennel described in claim 1 wherein the partition wall is affixed to the dog kennel.

9. The dog kennel described in claim 1 wherein the partition wall is removable.

10. The dog kennel described in claim 9 wherein an adjustable first foot is provided at the bottom end of the partition wall.

11. The dog kennel described in claim 9 wherein an adjustable second foot is provided at the top end of the partition wall.

12. The dog kennel described in claim 9 wherein a hook is provided at the top end of the partition wall.

13. The dog kennel described in claim 1 wherein the flap has a lock.

14. The dog kennel described in claim 13 wherein the lock prevents the flap from opening.

* * * * *